UNITED STATES PATENT OFFICE.

AMOS M. BAILEY, OF MIDDLE BRANCH, OHIO, ASSIGNOR TO THE BAILEY CANNING COMPANY, OF SAME PLACE.

PROCESS OF PURIFYING MAPLE SIRUP.

SPECIFICATION forming part of Letters Patent No. 323,254, dated July 28, 1885.

Application filed May 20, 1885. (No specimens.)

*To all whom it may concern:*

Be it known that I, AMOS M. BAILEY, of Middle Branch, in the county of Stark and State of Ohio, have invented certain new and useful Improvements in Process for Purifying Maple Sirup; and I do hereby declare the following to be a full, clear, and exact description of the invention, such as will enable others skilled in the art to which it pertains to make and use the same.

My process is as follows: The maple sirup when cold is placed in a suitable pan or container for heating, and for every one thousand pounds of sirup is added two gallons of milk, one dozen of eggs, the latter well beaten, and then the ingredients well stirred to mix them thoroughly. I next heat the mass slowly and bring it to a boiling point. I next add twenty-five pounds of double-refined glucose to prevent the sirup from granulating, and add also one-half pound of the ordinary baking soda and one ounce of alum. The two latter ingredients are to assist the eggs and milk in the purifying process. The mass is kept at the boiling-point, and well stirred and skimmed. This latter part of the process will usually require about forty minutes, more or less, according to the quantity of the sirup being purified. As soon as the impurities cease to rise to the surface the process is complete, and the fire may be removed and the sirup allowed to cool, or the sirup may be drawn off from the container, or the container with the sirup may be removed from the furnace, whichever way is most practicable, according to circumstances. Care should be taken not to scorch the sirup a slow steady fire being all that is required.

The sirup, when treated by this process, will be clear, of about the color of strained honey, and of a supreme quality.

The proportions of the ingredients may be slightly varied without producing any marked change in the product; but from a long experience in the business I would advise that the aforesaid directions and proportions of the ingredients be closely followed to assure the best results.

What I claim is—

The herein-described process of purifying maple sirup, consisting, essentially, in mixing with the sirup, in about the proportions of one thousand pounds of sirup, two gallons of milk, two dozen of eggs, well beaten, and applying heat to bring the mass to a boiling-point; second, to the heated mass adding about twenty-five pounds glucose, one-half pound baking soda, one ounce of alum, keeping the mass about at the boiling-point, stirring and skimming so long as impurities rise to the surface.

In testimony whereof I sign this specification in the presence of two witnesses this 14th day of May, 1885.

AMOS M. BAILEY.

Witnesses:
HENRY BIXLER,
B. E. WISE.